No. 869,264. PATENTED OCT. 29, 1907.
B. RICCIARDI.
TAILOR'S TAPE MEASURE.
APPLICATION FILED MAR. 6, 1906.
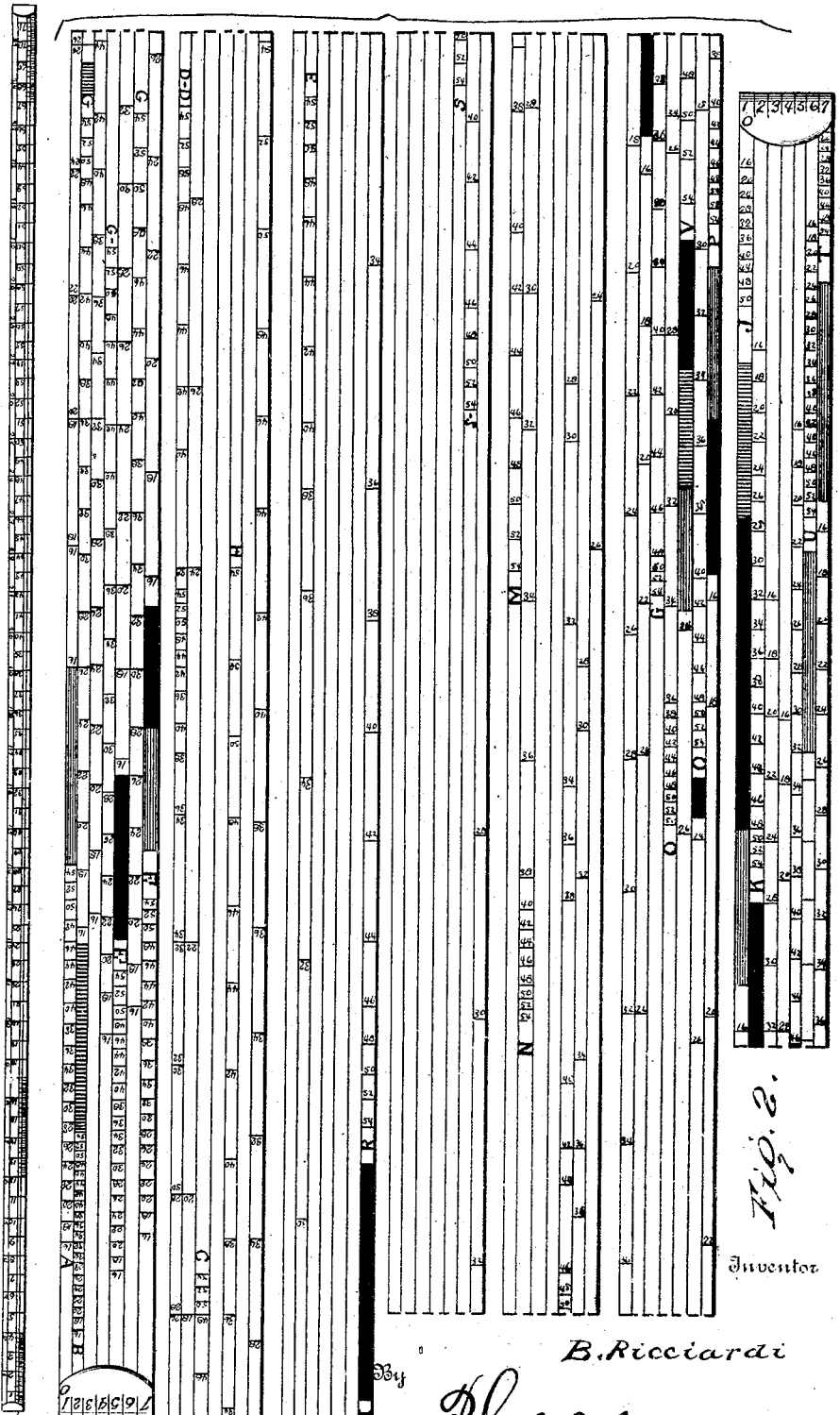

UNITED STATES PATENT OFFICE.

BARTOLOMEO RICCIARDI, OF NEW YORK, N. Y.

TAILOR'S TAPE-MEASURE.

No. 869,264.  Specification of Letters Patent.  Patented Oct. 29, 1907.

Application filed March 6, 1906. Serial No. 304,579.

*To all whom it may concern:*

Be it known that I, BARTOLOMEO RICCIARDI, a subject of the King of Italy, residing at New York, in the county of New York and State of New York, have invented certain new and useful Improvements in Tailors' Tape-Measures, of which the following is a specification.

This invention relates to the art of tailoring and particularly to a tape measure of that type which is used by tailors and dressmakers for laying out the designs of the various garments, either upon paper or cloth, as a pattern from which to afterwards cut the different pieces to form the garment, or directly upon the cloth out of which the garment itself is to be cut.

It has long been recognized in the art of tailoring that the various measurements of a body are under most conditions proportional to the chest measurement of the person. Accordingly the measurement of a person's chest has been taken as the standard measurement to which all the other measurements relate proportionately. For instance, in measuring a person for a suit, certain major measurements are taken, such as amplitude of chest, amplitude of back, length of arm from the arm pit to the wrist, length of leg from the crotch to the foot. In addition to these measurements which are called major measurements for the purpose of distinction, there are certain minor measurements, which are, however, most important in securing a proper fit, but which are not determined by actual measurements of a person's body. These minor measurements, such as the peak of a shoulder or the yoke of a coat, or the cuirass of a pair of trousers, or the like, are recognized to bear a definite proportion to the major measurements, and accordingly the major measurements alone are taken by actual measurements, and the others obtained by geometrical designs. These accordingly consist of a series of horizontal and perpendicular lines and are projected from the major measurements when the design is laid out. In laying out these designs, the amplitude of the chest or chest measurement is customarily taken as the standard, and accordingly, a certain line is spoken of in designing a garment, as the projection above the actual measurement of the "twelfth part of the amplitude of the chest", or the "fifth part of the amplitude of the chest", and so on.

My present invention has for its primary object a tape measure which is designed to expedite the work of a designer or cutter and assist him to the maximum degree in rapidly determining the proper minor measurements in projecting his lines.

To this end, my invention consists in an improved tape measure which displays in addition to a linear scale, certain other notations that indicate the various measurements or sizes of patterns to which a garment is to be cut by the tailor, ranging from the smallest to the largest sizes that are recognized as having become standardized in the trade, and the invention further consists in a tape measure of this character which may also be used by the tailor for taking the measurements of a person for his suit and can then be used by the tailor in properly laying out the pattern or otherwise projecting his geometrical figures for the proper cutting of the so called minor parts.

For a full understanding of the invention, reference is to be had to the accompanying drawing, in which:

Figure 1 is a face view of one side of my improved tailors' tape measure; and, Fig. 2 is a view of the other side thereof, upon an enlarged scale, it being understood that in the complete article the various sections portrayed in the drawing are all connected as one integral strip.

Corresponding and like parts are referred to in the following description and indicated in all the views of the drawings by the same reference characters.

In producing my improved tape measure, I take a strip of some non-stretchable fabric or material of a sufficient length to contain the various scales and notations hereinafter described. In the present instance, the strip is two yards long. On one face the strip displays a linear scale of seventy-two inches with fractions thereof, and along one side of this linear scale is a two inch scale all as best shown in Fig. 1 of the drawing. The opposite face of the measure is divided by parallel lines into seven columns which extend throughout its length and at each end it is reinforced by clips, preferably of metal, and which are numbered one to seven to correspond to the different columns.

Displayed within the respective columns are a series of notations which are designated, to distinguish one from the other, by suitable indicia, the different letters of the alphabet being used in the present instance as the most convenient means and as not liable to become confused with the numerical notations of the different series. In the present instance also, the number of these series of notations or scales, is such as to run from A to V.

It is to be particularly noted that practically all of these scales contain numerals "16", "18", "20", "22", "24", "26", and so on, up to "54", these numerals being the standardized size of suits, the standard being taken from the chest measurement, as it is well known that the chest measurement is taken as the primary measurement and that suits are designated as "16 size", or "34 size", or "54 size", according to the chest measurement, the other measurements being derived from this main measurement and it is with this in view that my improved tape measure has been invented.

Each one of the scales A to V is a proportional scale in that its notations "16" to "54" designate respectively the definite proportions of a chest measurement from "16" to "54" inches. Take, for instance, scales A and M. The scale A contains divisions of the twelfth part and the scale M of the one-half part. From this it is to be understood that as the notations of the scale A, running from "16" to "54" represent divisions of the twelfth part, that for a chest measurement of "48", the scale A will measure from "48" out to the end of the measure, exactly four inches, or one-twelfth part of "48". In similar manner, it is to be understood that the scale M contains divisions of the one-half part. Accordingly, then, the notation "16" on the scale M indicates that from said notation out to the adjacent end of the measure is eight inches or, again, the notations on the scale A being divisions of the twelfth part of the amplitude of the chest, the division "24" will manifestly be two inches from the end of the measure and the notation "36" three inches from the end of the measure. Or, in other words, my improved tailors' tape measure may be briefly described as follows: It contains on one face an inch scale, and on the other face a plurality of scales that I have termed proportional scales and each of which contains a series of notations from 16 to 54, indicating the various recognized sizes of chest measurements known in the tailoring art. Each one of these scales is a proportional or divisional scale in that each of its notations or numerals from 16 to 54 is located in registry with the numeral of the inch scale which is a quotient of the number on the proportional scale as a dividend and the arbitrarily selected proportional as divisor, such as one-twelfth or one-twenty-fourth that is selected for the particular proportional scale. Take, for example, again scale A, which contains divisions of the twelfth part. From this, it will be seen that as the numerals of the scale A running from 16 to 54 represent divisions of the twelfth part; that for the chest measurement of 48, for example, the numeral "48" on the scale A will register with the numeral 4 on the inch scale or one-twelfth of forty-eight. It is the same way with all of the other scales. For example, on that scale (M) which is a proportional scale of one-half parts, this numeral 16 will be found in registry with the numeral 8 of the inch scale designating eight inches, and so on. These proportional scales from "A" to "Z" extend from the two ends of the tape towards the middle, and the different numerals 16 to 54 on the respective scales are placed where they will be that number of inches from the end of the scale which is represented by a quotient of which such number of the proportional scale is the dividend, and the arbitrarily selected numeral, such as twelve, or one-twelfth, or, two, or one-half, as the divisor. By this, I mean to say that my invention is not necessarily limited to the showing displaying an inch or linear scale upon the tape, because even without this, those versed in the use of my improved tape measure will understand that the numerals 16 to 54 of the different proportional scales are so many inches from the end of the scale as is represented by the quotient above mentioned.

In using my improved tape measure, it is to be observed that I propose to use it in connection with an improved system of designing garments, the said system including a treatise on the art of designing, and an improved set square, which latter is the subject matter another application for patent and which I, therefore, deem it unnecessary to describe here. But, in using the system, I refer in the treatise to the different proportional scales from A to V, so that in speaking of projecting a certain distance to the right or left or up and down from a given point or extremity, I refer to the twelfth part of the chest measurement, or to the twenty-fourth part of the chest amplitude, or to the fourth part, and so on, and refer to the particular column and under what designating character or letter of the alphabet such proportional scale may be found. To illustrate the exact divisions or proportional parts of the chest measurement that I have arbitrarily selected for the different proportional scales, I merely state that scale A divides the various sized chest measurement into twelfth parts; B displays divisions of the twenty-fourth part; C of the fourth part; D of the one-half part; E of the one-third part; F of the twelfth part; G of the fifth part; H of the third part; I of the twelfth part; J of the thirty-second part; K of the 8th part; L of the thirty-second part; M of the one-half part; N of the one-half plus one-eighth part; O of the third part; P of the two-thirds part; Q of the third part; R of the thirty-second part; S of the one-half; T of the forty-eighth; U of the sixteenth; and V of the fifth.

In the above description, it will be noted that some of the proportional scales appear to be duplicated, but this is not the case. It is, of course, necessary to have in some instances different minor measurements or certain proportional scales for women and others for men, and these notations are accordingly contrasted in color, to distinguish them. As an example, it is to be understood that the F scale which divides the various chest measurements into twelve parts is for one sex, while the scale A which also divides the chest measurements into twelve parts is for the opposite sex. In the preferred arrangement of contrasting colors, I use one color for those proportional scales which apply to men only, another contrasting color for those which apply to women only and still another contrasting color which applies to both sexes equally.

I believe that the foregoing description in connection with the accompanying drawing is sufficient for those who are skilled in the art to which this invention appertains, to construct a tape measure embodying the features of my invention and I do not deem it necessary to further describe the operation of the measure, which I believe will be clear from the foregoing. It might be well to add, however, that each one of these proportional scales divides a chest measurement into certain proportionate parts, such as one-fourth or one-twelfth, and that the notations of the respective scales refer to the recognized sizes of chest measurements for suits that are now known in the trade. Suppose, for instance, that the tailor desires to cut a coat, size "36". By looking at all the numbers "36" in the measure, the tailor at once has the cut for one style or habit, and without the necessity of computing for all the divisions or proportions of the parts that are needful for cutting the minor features of the garment, particularly when referring to my improved treatise which refers back in its description to the different scales.

The reinforcing ends or clips assist in finding the proportional scales, as the number on said clips refer to the different columns, and hence when in my treatise, I speak of scale A, column 1, this scale may at once be found without the necessity of searching all over the face of the tape measure.

In addition to assisting the tailor in designing patterns for different garments for what is known as ready-made costumes, it is obvious that my improved measure may be equally used with made-to-order garments, as the person may be measured with that face of the measure which contains the linear scale and the measure then be used as above described in designing the different parts of the garment according to the proportional scales that refer to different proportions of the chest measurement.

Having thus described the invention, what is claimed, as new is:

1. The herein-described tailors' tape measure, provided with an inch scale and also provided with a series of proportional scales, the divisions of which have numerals designating the standard chest measurements recognized in the tailoring art, the said divisions being so arranged that the said numerals of each proportional scale are arranged respectively in registry with numerals of the inch scale that are the quotients resulting from the divisions of the numbers of that scale by the common divisor for that scale.

2. The herein-described tailor's tape measure, provided with an inch scale and also provided with a series of proportional scales, the divisions of which have numerals designating the standard chest measurements recognized in the tailoring art, the said divisions being so arranged that the said numerals of each proportional scale are arranged respectively in registry with numerals of the inch scale that are quotients resulting from the divisions of the numbers of that scale by the common divisor for that scale, the said proportional scales being parallel, and a series of parallel lines separating the same, and the tape being provided with end pieces numbered transversely to designate the different columns.

3. The herein-described tailors' tape measure provided on one face with a series of scales, the divisions of which have numerals designating the standard chest measurements recognized in the tailoring art, the said divisions being so arranged that the said numerals of each scale are located respectively distances from the end of the tape equal in inches to the number of inches obtained by dividing the said numerals on that scale by a common divisor for such scale.

In testimony whereof I affix my signature in presence of two witnesses.

BARTOLOMEO RICCIARDI. [L. S.]

Witnesses:
 VINCENZO LALLI,
 ANGELOMARIA LALLI.